United States Patent [19]
Theer

[11] 3,712,560
[45] Jan. 23, 1973

[54] CINEMATOGRAPHIC APPARATUS WITH REVERSIBLE FILM TRANSPORTING MEANS

[75] Inventor: Anton Theer, Munich, Germany

[73] Assignee: AGFA-Gevaert AG, Munich, Germany

[22] Filed: Aug. 23, 1971

[21] Appl. No.: 173,772

[30] Foreign Application Priority Data

Aug. 29, 1970 Germany............................P 20 42 956.6

[52] U.S. Cl....................................242/205, 352/191
[51] Int. Cl. .............................B11b 15/32, G03b 1/04
[58] Field of Search..............................242/205–210; 352/187–196

[56] References Cited

UNITED STATES PATENTS

| | | | |
|---|---|---|---|
| 3,061,160 | 10/1962 | Elsas | 352/192 X |
| 3,570,783 | 3/1971 | Winkler | 242/205 |

*Primary Examiner*—Leonard D. Christian
*Attorney*—Michael S. Striker

[57] ABSTRACT

The takeup reel of a motion picture camera is rotatable by the claw pull-down through the intermediary of two meshing gears one of which directly drives the reel. During stepwise forward transport of the film, the claw pull-down transmits recurrent alternating pivotal movements in opposite directions to a lever which carries two spring-biased main pawls each normally engaging one of the gears so that the one reel is rotated in a single direction, either because it is driven in such single direction by the respective pawl or because the other pawl drives the other gear in the opposite direction. The pawls can be disengaged from the respective gears to permit operation of the pull-down without causing a rotation of the takeup reel. It is optional to provide on the lever two auxiliary pawls each of which can be moved into engagement with a different gear when the main pawls are disengaged to thus rotate the respective gears in directions counter to those in which the gears are rotated by the main pawls so that the reel can pay out the film when the claw pull-down transports the film rearwardly.

12 Claims, 2 Drawing Figures

PATENTED JAN 23 1973

3,712,560

INVENTOR
ANTON THEER
BY

CINEMATOGRAPHIC APPARATUS WITH REVERSIBLE FILM TRANSPORTING MEANS

CROSS-REFERENCE TO RELATED INVENTION:

The present invention constitutes an improvement over and a further development of the invention which is disclosed in U.S. Pat. No. 3,570,783 granted Mar. 16, 1971 to Friedrich Winkler et al. and owned by the assignee of this application.

BACKGROUND OF THE INVENTION:

The present invention relates to cinematographic apparatus in general, and more particularly to improvements in transporting means for motion picture film in cinematographic apparatus, especially in motion picture cameras. Still more particularly, the invention relates to improvements in film transporting means of the type disclosed in the aforementioned U.S. Pat. No. 3,570,783 to Winkler et al.

The patent to Winkler et al discloses a cinematographic apparatus wherein the takeup reel is rotatable by a first toothed gear or wheel-shaped driven element which meshes with an identical second toothed driven element. The claw pull-down imparts recurrent alternating pivotal movements to a lever which carries two driving elements in the form of pawls each of which is biased against the teeth of a different driven element. The arrangement is such that one of the pawls rotates the first driven element in a given direction wen the lever pivots in a first direction, and that the first driven element is rotated in the same (given) direction when the lever pivots in a second direction because the lever then causes the other pawl to rotate the second driven element in a direction counter to the given direction. Thus, the takeup reel is rotated in a single direction (to collect the film) irrespective of whether the first driven element is rotated by one of the pawls or whether the other pawl rotates the second driven element.

The just described cinematographic apparatus has been found to be eminently suited for the transport of film in a motion picture camera, particularly in a camera for use with 8-millimeter film. However, such cinematographic apparatus cannot employ a reversible claw pull-down or an analogous feeding device which is designed to transport the film forwardly or rearwardly. This will be readily understood since the takeup reel is caused to rotate in a single direction in response to pivoting of the lever which carries the pawls, irrespective of whether such pivotal movements are brought about by a pull-down which transports the film stepwise in a forward direction or in a rearward direction.

Certain recent types of motion picture cameras are provided with an automatic or semiautomatic fading mechanism which enables the user to make exposures with fade-out effect or with fade-in effect as well as to expose certain film frames twice, first with fade-out effect and thereupon with fade-in effect. Such exposures render it necessary to transport a certain length of film rearwardly subsequent to completion of the exposures with fade-out effect but prior to the making of exposures with fade-in effect. If the takeup reel can rotate in a single direction (i.e., in a direction to collect the film), the collection of film must be interrupted during the making of exposures with fade-out effect, and the thus exposed length of film is thereupon transported rearwardly while the takeup reel continues to remain at a standstill. The housing of the camera or the cassette for motion picture film must be designed in such a way that it can receive the uncollected length of film which is exposed with fade-out effect as well as the same length of film during rearward transport prior to the making of exposures with fade-in effect.

If the takeup reel in a camera embodying a fading mechanism is designed to rotate forwardly and rearwardly, it is driven forwardly to collect the film during the making of exposures with fade-out effect and in the opposite direction during rearward transport of film frames which were exposed with fade-out effect.

Furthermore, it is often customary to use the mechanism which rotates the takeup reel as a means for driving a film frame counter or footage counter in order to insure that the position of the abservable part or parts of the counter is truly indicative of the length of film which is exposed and has been collected by the takeup reel or of the unexposed length of film. Such counters cannot derive motion from the mechanism which transmits motion to the takeup reel in the cinematographic apparatus of the patent of Winkler et al if the film is to be transported forwardly and rearwardly so that the counter must be operated in reverse during rearward transport of the film, for example, subsequent to completion of exposures with fade-out effect but prior to the making of exposures with fade-in effect.

SUMMARY OF THE INVENTION:

An object of the invention is to provide in a cinematographic apparatus novel and improved means for transporting the film in such a way that the customary claw pull-down or an analogous feeding device for intermittently advancing motion picture film can be operated to advance the film forwardly or rearwardly and that the takeup reel does not interfere with either mode of operation of the pull-down.

Another object of the invention is to provide a cinematographic apparatus wherein the takeup reel for motion picture film can be held against rotation during rearward transport of the film by the pull-down or an analogous feeder.

A further object of the invention is to provide a cinematographic apparatus wherein the takeup reel can be rotated in a direction to pay out the film when the pull-down is operated to transport the film rearwardly.

An additional object of the invention is to provide a cinematographic apparatus wherein the frame counter or footage counter invariably indicates the exact length of that portion of motion picture film which is collected by the takeup reel or the exact length of unexposed portion of the film.

The invention is embodied in a cinematographic apparatus, especially in a motion picture camera, preferably in a motion picture camera for use with 8-millimeter film which employs a reversible claw pull-down or an analogous feeding device for transporting the film stepwise forwardly or rearwardly. The cinematographic apparatus comprises a film transporting, advancing and collecting mechanism which includes a rotary film collecting member (such as a takeup reel), a first rotary driven element which preferably constitutes a toothed gear or wheel and is directly or indirectly connected with the film collecting member, a second rotary driven element which is preferably identical with the first driven element and normally cooperates with the first element (preferably by being in mesh therewith) to rotate in a second direction when the first driven element is rotated in a first direction and to drive the first element in the first direction when rotated in the second direction, a claw pull-down or other suitable feeding means which is operable to transport the film in at at one direction (i.e., in the forward direction), motion transmitting means interposed between the feeding means and the driven elements and comprising a pair of driving elements (each of which is preferably a spring-biased pawl) and at least one driving member which is arranged to perform recurrent alternating movements in opposite directions in response to operation of the feeding means to thereby respectively rotate the first and second driven elements by way of the first and second driving elements, and disengaging means which is actuatable (either by hand or by automatically) to disengage the driving elements from the driven elements so that such driving elements cannot rotate the respective driven elements when the feeding means is operated, for example, to transport the film rearwardly.

The novel features which are considered as characteristic of the invention are set forth in particular in the appended claims. The improved cinematographic apparatus itself, however, both as to its construction and its mode of operation, together with additional features and advantages thereof, will be best understood upon perusal of the following detailed description of certain specific embodiments with reference to the accompanying drawing.

Figure 1:
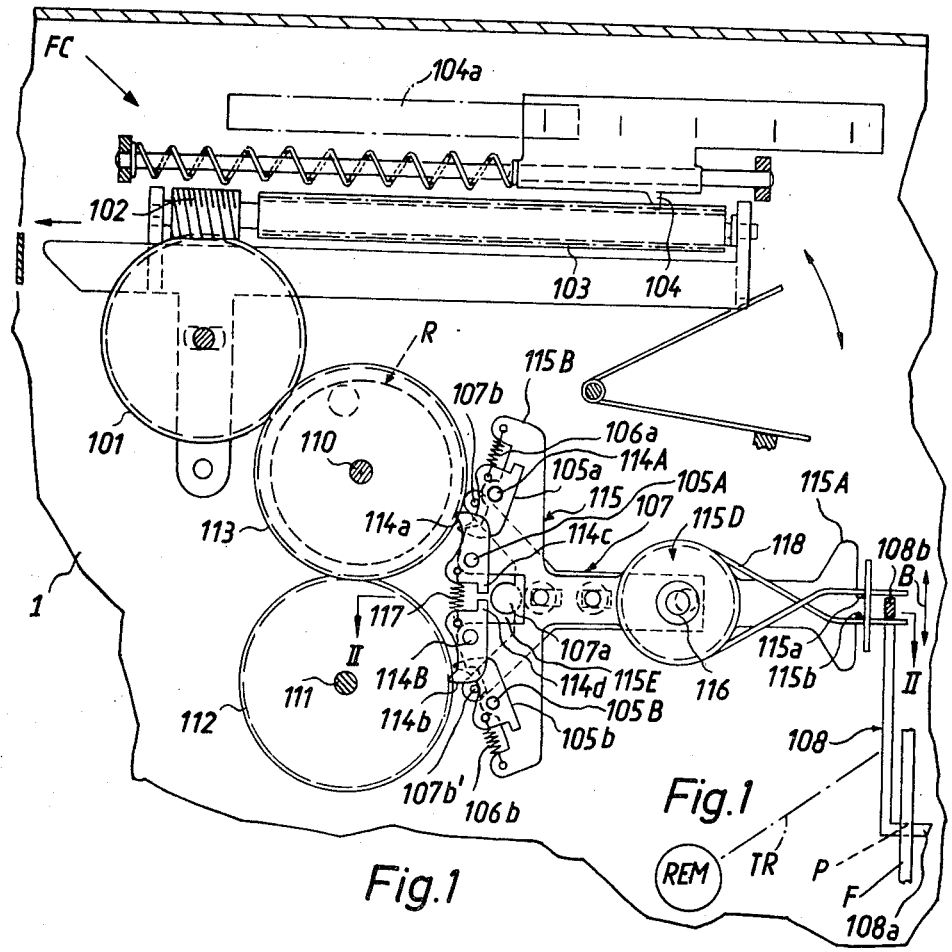
FIG. 1 is a fragmentary sectional view of a motion picture camera which embodies the invention.

DESCRIPTION OF THE PREFERRED EMBODIMENTS:

Referring to the drawing in detail, there is shown a motion picture camera for use with 8-millimeter film F. The camera comprises a housing or body 1 containing a film feeding or transporting mechanism which includes a reversible feeder in the form of a claw pull-down 108 having a claw 180a which can enter the perforations P of motion picture film F to transport the latter in stepwise fashion, either forwardly during the making of normal exposures or during the making of exposures with fade-out or fade-in effect, or rearwardly subsequent to the making of exposures with fade-out effect but prior to fade-in. In this way, the frames of the film F which were exposed with fade-out effect can be exposed again but with fade-in effect. The camera also comprises a dissolving shutter (not shown) which is adjustable to gradually reduce the admission of scene light during the making of exposures with fade-out effect, to remain closed during rearward transport of film following the completion of a set of exposures with fade-out effect and to gradually increase the rate of admission of scene light during the making of exposures with fade-in effect.

The claw pull-down 108 is driven by a reversible electric motor REM through the intermediary of a gear train or another suitable transmission TR (indicated schematically by a phantom line) which can move the claw 108a in and out of the perforations P as well as lengthwise of the film F so as to transport the film forwardly or rearwardly. The pull-down 108 further transmits motion to a first driving member 180b which forms part of a motion transmitting mechanism and is arranged to perform recurrent oscillatory and/or reciprocatory movements and to thereby drive a second driving member 115 of the motion transmitting mechanism. The latter serves to rotate a pair of rotary driven elements here shown as toothed wheels or gears 112, 113. In the illustrated embodiment, the gear or wheel 113 is mounted on and rotates a shaft 110 which in turn drives a film collecting member R, such as a takeup spool or reel. The gear 113 meshes with the gear 112 which latter is mounted on a shaft 11 parallel to the shaft 110. The shafts 110, 111 are journalled in the housing 1. The diameters of the gears 112, 113 are identical and each of these gears has the same number of teeth.

The teeth of the gear 113 further mesh with the teeth of a gear 101 forming part of a footage counter or frame counter FC which is preferably of the type disclosed in U.S. Pat. No. 3,578,856 granted May 18, 1971 to Kurt Thate et al. and owned by the assignee of the present application. The details of the footage counter FC form no part of the present invention; FIG. 1 merely shows a gear wheel 102 which meshes with the gear 101 and drives an elongated worm 103, a follower 104 which can move in parallelism with the axis of the worm 103 when the latter is rotated by the gear wheel 102, and a suitably graduated scale 104a adjacent to the follower 104.

The motion transmitting mechanism between the driving member 108b and the gears 112, 113 comprises aforementioned second driving member 115 which is a two-armed lever 115, a torsion spring 118 which is interposed between the driving member 108b and the right-hand arm 115A of the lever 115, and a pair of main driving elements shown here as pawls 114a, 114b which are mounted on the left-hand arm 115B of the lever 115. the purpose of the pawls 114a, 114b is to respectively rotate the gears 113, 112 in opposite directions in response to recurrent pivotal back-and-forth movements of the lever 115 take place in response to recurrent movements of the driving member 108b when the claw pull-down 108 is set to transport the film F forwardly in normal operation of the motion picture camera or during the making of exposures with fade-out or with fade-in effect. It is assumed that the pawl 114a serves to rotate the gear 113 in a counterclockwise direction, as viewed in FIG. 1, when the lever 115 is pivoted in a clockwise direction. The pawl 114b then serves to rotate the gear 112 in a clockwise direction when the lever 115 is caused to pivot in an anticlockwise direction. Since the teeth of the gears 112, 113 are in permanent mesh, clockwise rotation of the gear 112 entails anticlockwise rotation of the gear 113, i.e., the film collecting reel R is normally rotated anticlockwise (in a direction to collect the film F) irrespective of whether the lever 115 pivots in a clockwise or in a counterclockwise direction. The pivot axis for the lever 115 is defined by a shaft 116 which is mounted in the housing 1. Since the teeth of the gear 101 of the footage counter FC are in permanent mesh with the teeth of the gear 113, the follower 104 of the footage counter FC will overlie a gradually increasing portion of the footage indicating scale 104a when the lever 115 is pivoted back and forth while the pull-down 108 is driven by the reversible motor REM in a manner and for the purpose of advancing the film F forwardly.

The pawls 114a, 114b are coupled to each other by a resilient element in the form of a helical spring 117 and are pivotally mounted on the arm 115B, as at 114A, 114B. The purpose of the spring 117 is to respectively bias the pallets of the pawls 114a, 114b against the teeth of the gears 113, 112 but to permit the pallet of the pawl 114b to ride over the teeth of the gear 112 when the gear 113 is rotated by the pawl 114a as well as to permit the pallet of the pawl 114a to ride over the teeth of the gear 113 when the gear 112 is rotated by the pawl 114b.

Figure 2:
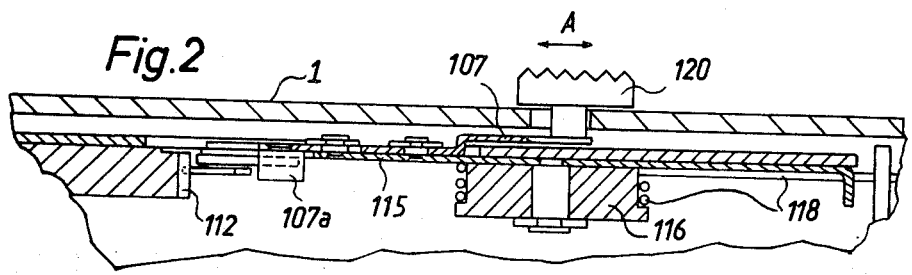
FIG. 2 is a sectional view as seen in the direction of arrows from the line II—II of FIG. 1.

The arm 115A of the lever 115 is pivoted with two stops 115a, 115b which are adjacent to the driving member 108b and serve as abutments for the respective legs of the torsion spring 118. The latter is convoluted around a cylindrical hub 115D of the lever 115, this hub being mounted on the shaft 116 (see particularly FIG. 2). The legs of the spring 118 flank the driving member 108b so that they impart to the lever 115 recurrent pivotal movements in clockwise and counterclockwise directions in response to recurrent movements of the driving member 108b under the action of the claw pull-down 108. If the film collecting member R is arrested or contains such a length of convoluted film F that it cannot rotate in a counter-clockwise direction, the legs of the torsion spring 118 yield when the motor REM continues to operate the pull-down 108. Such legs then move alternately away from the respective stops 115a, 115b while the driving member 108b is free to continue its recurrent movements without any damage to the pull-down 108 and/or to other parts of the camera.

Since the illustrated camera employs a reversible electric motor REM, a reversible claw pull-down 108, and is assumed to embody a dissolving shutter, it is necessary to insure that the pull-down 108 can transport the film F rearwardly (as mentioned before, such rearward transport of the film is necessary if the film frames which were exposed with fade-out effect are to be exposed again but with fade-in effect) without, however, rotating the gear 113 in a counterclockwise direction, i.e., in a direction to wind the film F on the takeup reel R. If the pawls 114a, 114b were to remain in the engaging positions shown in FIG. 1 while the pull-down 108 transports the film F rearwardly, the lever 115 would again perform alternating clockwise and counterclockwise pivotal movements about the axis of its shaft 116 and the gear 113 could again rotate in a counterclockwise direction, either in response to the action of the pawl 114a or in response to the action of the pawl 114b (by way of the gear 112). Also, the gear 113 would continue to rotate the gear 101 in a clockwise direction so that the scale 104a would indicate further exposures even though the film F would be transported rearwardly.

In accordance with a feature of the present invention, the camera is provided with disengaging means which can disconnect the pawls 114a, 114b from the gears 113, 112 so that the pivoting of lever 115 by the driving member 108b while the claw pull-down 108 transports the film F rearwardly cannot cause a counterclockwise rotary movement of the gear 113 and a clockwise rotary movement of the gear 101 in the footage counter FC. The disengagement of pawls 114a, 114b from the gears 113, 112 can take place automatically or at the will of the operator.

In accordance with an optional but highly advantageous and desirable feature of the invention, the camera is further provided with means which can rotate the gear 113 in a clockwise direction so that the takeup reel R will pay out the film and that the gear 101 will be rotated in a counterclockwise direction (so that the footage counter FC will indicate to the user that the film F is being transported rearwardly).

The disengaging means comprises a reciprocable disengaging member or slide 107 which is connected with a handgrip member 120. The latter is accessible from without the housing 1 and is movable back and forth (as indicated by the arrow A shown in FIG. 2) to move the slide 107 between the retracted or inoperative position (shown in FIGS. 1 and 2) and an extended or operative position in which a pin or post-shaped projection 107a of the slide engages extensions or lugs 114c, 114d of the pawls 114a, 114b and pivots these pawls in opposite directions so that the pallet of the pawl 114a is disengaged from the teeth of the gear 113 and the pallet of the pawl 114b is disengaged from the teeth of the gear 112 even at the time when the lever 115 is pivoted back and forth by the driving member 108b. Thus by the simple expedient of moving the slide 107 from the inoperative to the operative position, the user of the camera can disengage the pawls 114a, 114b from the gears 113, 112 to thus interrupt the transmission of motion from the driving member 108b to the gears 112, 113 and hence to the takeup reel R. The arm 115b of the lever 115 has a centrally located recess, cutout or the like (shown at 115E) which receives the projection 107a with requisite clearance so that the projection 107a does not interfere with transmission of motion to the gears 112, 113 by the pawls 114b, 114a when the lever 115 is being pivoted by the driving member 108b while the pull-down 108 transports the film F forwardly. Also, the recess 115E is large enough to insure that the driving member 108b can pivot the lever 115 back and forth when the pawls 114a, 114b are respectively disengaged from the gears 113, 112. If desired, the connection between the handgrip portion 120 and the slide 107 can be such that the slide 107 is free to share the pivotal movements of the lever 115 about the axis of the shaft 116 and is movable by the member 120 radially of the shaft 116 to thereby place the projection 107a into the operative or inoperative position.

The means for rotating the gear 113 in a direction to cause the takeup reel R to pay out the film F comprises two auxiliary driving elements or pawls 105a, 105b which are also mounted on the arm 115b of the lever 115 but are positioned in such a way that, when their pallets are respectively allowed to engage the teeth of the gears 113, 112 while the lever 115 is being pivoted by the driving member 108b the pawl 105a rotates the gear 113 in a clockwise direction and the apwl 105b rotates the gear 112 in a counterclockwise direction (whereby the gear 112 rotates the gear 113 in a clockwise direction to cause the reel R to pay out the film F). The auxiliary pawls 105a, 105b are respectively mounted on pivot pins 105A, 105B which are carried by the arm 115B of the lever 115 and these pawls are respectively biased by helical springs 106a, 106b which are mounted on the arm 115B in such a way that the pallets of the pawls 105a, 105b respectively tend to engage the adjacent teeth of the gears 113, 112.

In order to insure that the auxiliary pawls 105a, 105b cannot interfere with the action of the main pawls 114a, 114b when the slide 107 is maintained in the illustrated inoperative position, the motion picture camera further comprises operating means for disengaging the pawls 105a, 105b from the gears 113, 112 when the gears 113, 112 are respectively rotatable by the pawls 114a, 114b. In the illustrated embodiment, the operating means for the auxiliary pawls 105a, 105b is not an independent device but forms part of the slide 105, i.e., of the disengaging means for the main pawls 114a, 114b. To this end, the slide 107 carries two additional pins or posts 107b, 107b' which can respectively pivot the pawls 105a, 105b about the axes of the pins 105A, 105B against the opposition of the respective helical springs 106a, 106b. The arrangement is such that the posts 107b, 107b' are operative to respectively maintain the pawls 105a, 105b in disengaged positions in the inoperative position of the slide 107, i.e., when the projection 107a does not prevent the pallets of the main pawls 114a, 114b from rotating the respective gears 113, 112 in a counterclockwise and counterclockwise direction in response to pivoting of the lever 115 by the driving member 108b. It is clear, however, that the camera of the present invention can be provided with disengaging means for the pawls 114a, 114b and with independent operating means for the pawls 105a, 105b. As a rule, the arrangement which is shown in the drawing will be preferred because the pawls 114a, 114b should be permitted to rotate the gears 113, 112 when the pawls 105a, 105b are inactive, and vice versa.

THE OPERATION

The parts of the camera assume the illustrated positions when the motor REM is set to operate the claw pull-down in a manner to advance the film F forwardly in stepwise fashion, always by the length of a frame so that successive unexposed frames of the film F register with a light-admitting aperture which is controlled by the aforementioned dissolving shutter. The claw pull-down 108 reciprocates or oscillates the driving member 108b in directions indicated by the arrow B whereby the driving member 108b pivots the lever 115 back and forth by way of the torsion spring 118. The slide 107 is maintained in the inoperative position so that the posts 107b, 107b' maintain the pallets of the auxiliary pawls 105a, 105b away from the teeth of the gears 113, 112. However, the projection 107a of the slide 107 allows the main pawl 114a to rotate the gear 113 (and hence the takeup reel R) in a counterclockwise direction when the driving member 108b pivots the lever 115 in a clockwise direction and the main pawl 114b to rotate the gear 112 in a clockwise direction (whereby the gear 112 rotates the gear 113 in a counterclockwise direction) when the driving member 108b causes the lever 115 to pivot in a counterclockwise direction. The pallet of the pawl 114b is free to ride over the teeth of the gear 112 when the gear 113 is rotated by the pallet of the pawl 114a, and vice versa. The same holds true for the auxiliary pawls 105a, 105b.

If the user of the camera wishes to transport the film F rearwardly, for example, upon completed exposure of a predetermined number of film frames with fade-out effect, the direction of operation of the motor REM is reversed and the slide 107 is moved by the handgrip member 120 to assume its inoperative position. The projection 107a engages the extensions 114c, 114d and pivots the respective main pawls 114a, 114b against the opposite of the spring 117 so that the pallets of the pawls 114a, 114b are moved sufficiently away from the teeth of the gears 113, 112 to insure that they cannot interfere with rotation of the gears 113, 112 in a clockwise and counterclockwise direction, respectively. As soon as the slide 107 is moved to its inoperative position, the posts 107b, 107b' are moved to the left, as viewed in FIG. 1, and allow the springs 106a, 106b to respectively pivot the auxiliary pawls 105a, 105b into engagement with the teeth of the gears 113, 112. If the motor REM thereupon drives the claw pull-down 108 in a manner to transport the film F rearwardly, the gear 113 rotates clockwise and causes the takeup reel R to pay out the film. At the same time, the gear 113 drives the gear 101 in a counterclockwise direction so that the follower 104 gradually exposes an increasing portion of the scale 104a to thus indicate to the user that the film F is being transported in a rearward direction.

The pawls 105a, 105b are immediately disengaged from the respective gears 113, 112 and these gears are respectively engaged by the pawls 114a, 114b in automatic response to each return movement of the slide 107 to the illustrated inoperative position. Such inoperative position of the slide 107 corresponds to the operative positions of its posts 107b, 107b' which constitute the disengaging or operating means for the auxiliary pawls 105a, 105b.

It is clear that the improved camera is susceptible of many additional modifications without departing from the the spirit of the invention. Thus, and as mentioned above, the slide 107 can be moved in a fully automatic way, for example, in response to actuation of a reversing switch (not shown) which is employed to set the motor REM for operation in a forward or rearward direction. When the motor REM is set to transport the film F forwardly by way of the claw pull-down 108, the slide 107 is automatically caused to assume its inoperative position (for example, in response to energization or deenergization of an electromagnet, not shown). Inversely, when the motor REM is set to transport the film F rearwardly, again by way of the claw pull-down 108, the condition of the aforementioned electromagnet is changed to thereby allow or cause the slide 107 to assume its operative position and to disengage the main pawls 114a, 114b while allowing the springs 106a, 106b to move the auxiliary pawls 105a, 105b to their active positions.

The aforementioned reversing switch for the motor REM can be actuated by the handgrip portion 120 for moving the slide 107.

If the auxiliary pawls 105a, 105b are omitted (these pawls are optional but desirable in the camera of the present invention), the slide 107 can be operatively connected with the actuating means for the aforementioned dissolving shutter to automatically assume its operative position (i.e., to disengage the pawls 114a, 114b from the gears 113, 112) when the dissolving shutter is being adjusted during the making of exposures with fade-out effect and during rearward transport of the film F. The takeup reel R (which is preferably, but not necessarily, mounted in a suitable cassette, not shown) is then at a standstill while the claw pull-down 108 transports the film F forwardly during fade-out and rearwardly subsequent to fade-out but prior to fade-in. The interior of the cassette or the interior of the housing 1 is then designed in such a way that the cassette or the housing can accommodate, in the form of one or more loose loops, that length of the film F which is being transported forwardly during fade-out and rearwardly prior to fade-in. Such loosely looped film is collected by the reel R when the camera makes exposures with fade-in effect; the slide 107 is then moved to its inoperative position, either automatically or in response to actuation of the fading mechanism, to insure that the gear 113 is rotated in a counterclockwise direction while the pull-down 108 transports the film F forwardly during fade-in.

The motor REM can be replaced with a motor whose output shaft rotates in a single direction if the pull-down receives motion from a system of advancing cams which can move its claw forwardly while the claw extends into a perforation P or rearwardly also while the claw extends into a perforation P of the film. Such advancing cams are disclosed, for example, in the copending application, Ser. No. 25,102 filed Apr. 2, 1970 by Herbert Wilsch et al. and owned by the assignee of the present application.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the claims.

What is claimed as new and desired to be protected by Letters Patent is set forth in the appended

1. In a cinematographic apparatus, the combination of a rotary film collecting member; a first rotary driven element operatively connected with said member; a second rotary driven element cooperating with said first element to rotate in a second direction when said first element is rotated in a first direction and to drive said first element in said first direction when rotated in said second direction; feeding means operable to transport the film in at least one direction; motion transmitting means interposed between said feeding means and said driven elements and comprising a pair of driving elements and at least one driving member arranged to perform recurrent alternating movements in opposite directions in response to operation of said feeding means to thereby respectively rotate said first and second driven elements by way of said first and second driving elements; and disengaging means actuatable to disengage said driving elements from said driven elements.

2. The combination as defined in claim 1, wherein said driven elements are gears having mating teeth and said driving elements are pawls pivotably supported by said driving member.

3. The combination as defined in claim 1, further comprising first and second auxiliary driving elements respectively arranged to rotate said first and second driven elements in said second and first directions in response to said recurrent movements of said driving member, and operating means for moving said auxiliary driving elements into and from engagement with said first and second driven elements.

4. The combination as defined in claim 3, wherein said operating means is arranged to move said auxiliary driving elements into engagement with the respective driven elements when said disengaging means is actuated to disengage said first mentioned driven elements from the respective driven elements, and vice versa.

5. The combination as defined in claim 3, wherein said driven elements are meshing gears and said driving elements are pawls pivotably mounted on said driving member, and further comprising resilient means for normally biasing said pawls into engagement with the teeth of the respective gears.

6. The combination as defined in claim 5, wherein said driving member is a lever which is pivotable about a predetermined axis to thus perform said recurrent alternating movements.

7. The combination as defined in claim 3, wherein said operating means is provided on said disengaging means.

8. The combination as defined in claim 7, wherein said driven elements are gears which mesh with each other and said driving elements are pawls pivotally mounted on said driving member, and further comprising resilient means for biasing said pawls into engagement with the respective gears, said disengaging means comprising at least one first disengaging member movable into and from engagement with the pawls constituting said first mentioned driving elements to thereby respectively move such pawls from engagement with said gears and to permit the respective resilient means to return such pawls into engagement with the respective gears, said operating means comprising at least one second disengaging member movable into and from engagement with the pawls constituting said auxiliary driving elements to thereby disengage such pawls from the respective gears against the opposition of the respective resilient means and to permit the respective resilient means to return such pawls into engagement with the respective gears.

9. The combination as defined in claim 1, further comprising footage counter means receiving motion from one of said driven elements to thereby indicate the length of at least one of two film portions including an unexposed portion and an exposed portion.

10. The combination as defined in claim 1, further comprising a second driving member receiving motion from said feeding means and arranged to transmit said recurrent movements to said first mentioned driving member, said driving elements being mounted on and being arranged to share such recurrent movements of said first mentioned driving member.

11. The combination as defined in claim 1, wherein said feeding means is operative to transport the film in said one direction and in another direction counter to said one direction, said disengaging means being arranged to disengage said driving elements from the respective driven elements in response to each change of film transport by said feeding means from said one direction to said other direction.

11. The combination of claim 1, wherein said feeding means comprises a reversible claw pull-down.

* * * * *